(12) United States Patent
Wu et al.

(10) Patent No.: US 7,900,070 B2
(45) Date of Patent: Mar. 1, 2011

(54) POWER SAVING METHOD OF BI-DIRECTIONAL COMMUNICATION WIRELESS PERIHERAL DEVICE

(75) Inventors: Hsin-Ju Wu, Hsinchu (TW); Dar-chern Su, Hsinchu (TW); Albert Chen, Hsinchu (TW)

(73) Assignee: Integrated System Solution Corp., Hsinchu (TW)

( * ) Notice: Subject to any disclaimer, the term of this patent is extended or adjusted under 35 U.S.C. 154(b) by 876 days.

(21) Appl. No.: 11/755,005

(22) Filed: May 30, 2007

(65) Prior Publication Data

US 2008/0209083 A1  Aug. 28, 2008

(30) Foreign Application Priority Data

Feb. 27, 2007  (TW) .............................. 96106812 A

(51) Int. Cl.
*G06F 1/32* (2006.01)
*G06F 1/00* (2006.01)
*H04B 1/38* (2006.01)

(52) U.S. Cl. .................. 713/320; 713/323; 455/574

(58) Field of Classification Search .................. 713/300, 713/320, 323, 324
See application file for complete search history.

(56) References Cited

U.S. PATENT DOCUMENTS

| | | | |
|---|---|---|---|
| 6,351,468 B1 * | 2/2002 | LaRowe et al. | 370/449 |
| 7,440,781 B2 * | 10/2008 | Beach et al. | 455/574 |
| 7,630,723 B2 * | 12/2009 | Vargas | 455/456.4 |
| 2006/0090091 A1 * | 4/2006 | Li | 713/320 |
| 2007/0195799 A1 * | 8/2007 | Kanazawa et al. | 370/401 |
| 2007/0226522 A1 * | 9/2007 | Aleksic et al. | 713/300 |
| 2008/0100575 A1 * | 5/2008 | Sutardja | 345/164 |

* cited by examiner

*Primary Examiner*—Suresh K Suryawanshi
(74) *Attorney, Agent, or Firm*—Jianq Chyun IP Office

(57) ABSTRACT

A power saving method of a bi-directional communication wireless peripheral device includes providing a wireless communication protocol between a host and the bi-directional communication wireless peripheral device; establishing a bi-directional communication wireless link between the host and the bi-directional communication wireless peripheral device through the wireless communication protocol; and enter a power off mode when the bi-directional communication wireless link does not exist.

6 Claims, 2 Drawing Sheets

POWER SAVING METHOD OF BI-DIRECTIONAL COMMUNICATION WIRELESS PERIHERAL DEVICE

CROSS-REFERENCE TO RELATED APPLICATION

This application claims the priority benefit of Taiwan application serial no. 96106812, filed Feb. 27, 2007. All disclosure of the Taiwan application is incorporated herein by reference.

BACKGROUND OF THE INVENTION

1. Field of the Invention

The present invention relates to a computer wireless peripheral device. More particularly, the present invention relates to a bi-directional communication wireless peripheral device and a power saving method thereof.

2. Description of Related Art

With the rapid development of information technology, computers have become an indispensable tool in daily life. A conventional computer architecture includes a computer host, a display, and several peripheral equipments connected to the computer host. Along with the quick development of this industry, in addition, competition and the demand for light, thin, short and small exterior features result from the enhancement of operation speed and user-friendly interface for all users. Therefore, people related to the field of peripheral equipment have developed some wireless peripheral devices having wireless I/O characteristics, e.g., wireless mice and wireless keyboards, etc, which are mainly directed to improving the convenience for operators and avoiding the trouble of a clutter of wires.

However, as the above wireless peripheral devices generally use batteries as their main electrical power supplying source, so the power consumption must be highly considered for the wireless peripheral device. A power management strategy is usually set in the common wireless peripheral device by means of software or hardware. If the power management strategy of the wireless peripheral device is unsatisfactory, users should change or charge batteries for this device frequently, thus causing inconvenience to users.

FIG. 1 is a state diagram of a wireless peripheral device managed by a conventional power management strategy. Referring to FIG. 1, there are three operational modes, namely a working mode 101, a stand-by mode 102, and a power off mode 103. A conventional wireless peripheral device usually enters the working mode 101 firstly after the activation is completed, and at this time, the power consumption is maximal. During a preset time T1, if the wireless peripheral device does not receive a user operation, the conventional wireless peripheral device will enter the stand-by mode 102 from the working mode 101. Generally speaking, in the stand-by mode 102, usually certain specific functions of the wireless peripheral device are turned off, and certain necessary functions remain working. For example, as for a wireless optical mouse when in the stand-by mode 102, a light-emitting diode (LED) of an optical sensor under the optical mouse may flash or become dim, the operating clock frequency of its micro-processor may become lower from time to time, or the optical sensor is completely turned off to reduce power consumption, and only a key-pushed function is reserved to wake up the optical mouse to reinstate the working mode 101.

If the wireless peripheral device does not receive a user operation during the stand-by mode for another preset time T2, it then enters the power off mode 103 from the stand-by mode 102. Generally speaking, the power off mode 103 refers to the device consuming almost no power in this mode. The user cannot make the wireless peripheral device enter the working mode 101 from the power off mode 103 unless a standard power-on procedure is performed. However, the preset times T1 and T2 are not particularly defined, and can be defined by the behavior pattern of consumers to this product. If the time T1 or T2 is defined too short, the user may feel that the operation of the wireless peripheral device is not sensitive. If the time T1 or T2 is defined too long, large power is consumed.

SUMMARY OF THE INVENTION

Accordingly, the present invention is directed to provide a power saving method and a bi-directional communication wireless peripheral device for solving the problem of unnecessary power consumption in the conventional art.

The present invention provides a power saving method for a bi-directional communication wireless peripheral device which is used to communicate with a host. The method includes providing a wireless communication protocol between the host and the bi-directional communication wireless peripheral device; establishing a bidirectional communication wireless link between the host and the bi-directional communication wireless peripheral device through the wireless communication protocol; and entering a power off mode when the bi-directional communication wireless link does not exist, in which in the power off mode, the functional modules are in a non-operating state.

In the power saving method according to a preferred embodiment of the present invention, the bi-directional communication wireless peripheral device further includes the following operational modes: an initial mode, a working mode, and a stand-by mode. In the initial mode, a plurality of functional modules of the bi-directional communication wireless peripheral device is activated. In the working mode, the functional modules are in the operating state. In the stand-by mode, a part of the functional modules are in the non-operating state.

In the power saving method according to a preferred embodiment of the present invention, when in the initial mode, the method further includes establishing the bidirectional communication wireless link; entering the working mode when the bi-directional communication wireless link is established; and entering the power off mode when it fails to establish the bi-directional communication wireless link.

In the power saving method according to a preferred embodiment of the present invention, the method further includes entering the stand-by mode after a predetermined time since the bi-directional communication wireless peripheral device does not receive a user operation in the working mode.

The present invention provides a bi-directional communication wireless peripheral device, which includes a plurality of functional modules, a wireless communication module, and a power management apparatus. The wireless communication module includes a wireless communication protocol for establishing a bi-directional communication wireless link to the host through the wireless communication protocol. The power management apparatus is used to turn off the functional modules when the bi-directional communication wireless link does not exist.

In the bi-directional communication wireless peripheral device according to a preferred embodiment of the present invention, the power management apparatus includes a state machine having an initial mode, a working mode, a stand-by mode, and a power off mode. The initial mode is used to activate the plurality of functional modules of the bi-directional communication wireless peripheral device, and to establish the bi-directional communication wireless link. In the working mode, the functional modules are in the operating state. In the stand-by mode, a part of the functional modules are in the non-operating state. In the power off mode, all functional modules are in the non-operating state. When the bi-directional communication wireless link is established, the bi-directional communication wireless peripheral device enters the working mode. After a predetermined time since the bi-directional communication wireless peripheral device does not receive a user operation during the working mode, the bi-directional communication wireless peripheral device enters the stand-by mode. When the bi-directional communication wireless link does not exist, it enters the power off mode.

In the bi-directional communication wireless peripheral device according to a preferred embodiment of the present invention, the state machine further includes an attempt link mode. When the link breaks off, the bi-directional communication wireless peripheral device enters the attempt link mode to attempt to reestablish the bi-directional communication wireless link.

The present invention adopts the wireless communication protocol for establishing a bi-directional communication wireless link between the host and the bidirectional communication wireless peripheral device. When it fails to establish the bi-directional communication wireless link, enter a power off mode, so the electric power consumed for waiting for a preset time to enter the power off mode in the conventional art is saved, and thus the unnecessary power consumption can be greatly reduced according to the present invention. When the bi-directional communication wireless link breaks off because the host is shut down, or the bidirectional communication wireless peripheral device is too far away from the host, or a communication frequency band is seriously interfered, the bi-directional communication wireless peripheral device cannot receive any message from the host, and once it is assured that the bi-directional communication wireless link between the bi-directional communication wireless peripheral device and the host does not exist, the bi-directional communication wireless peripheral device immediately enters a power off mode. In this manner, the unnecessary power consumption is greatly reduced.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
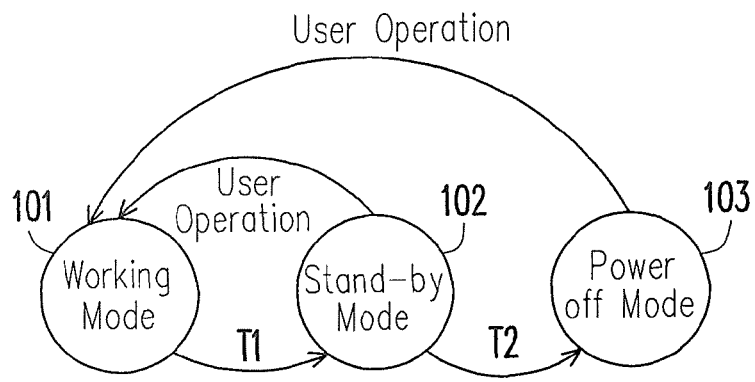
FIG. 1 is a state diagram of a wireless peripheral device managed by a conventional power management strategy.
Figure 2:
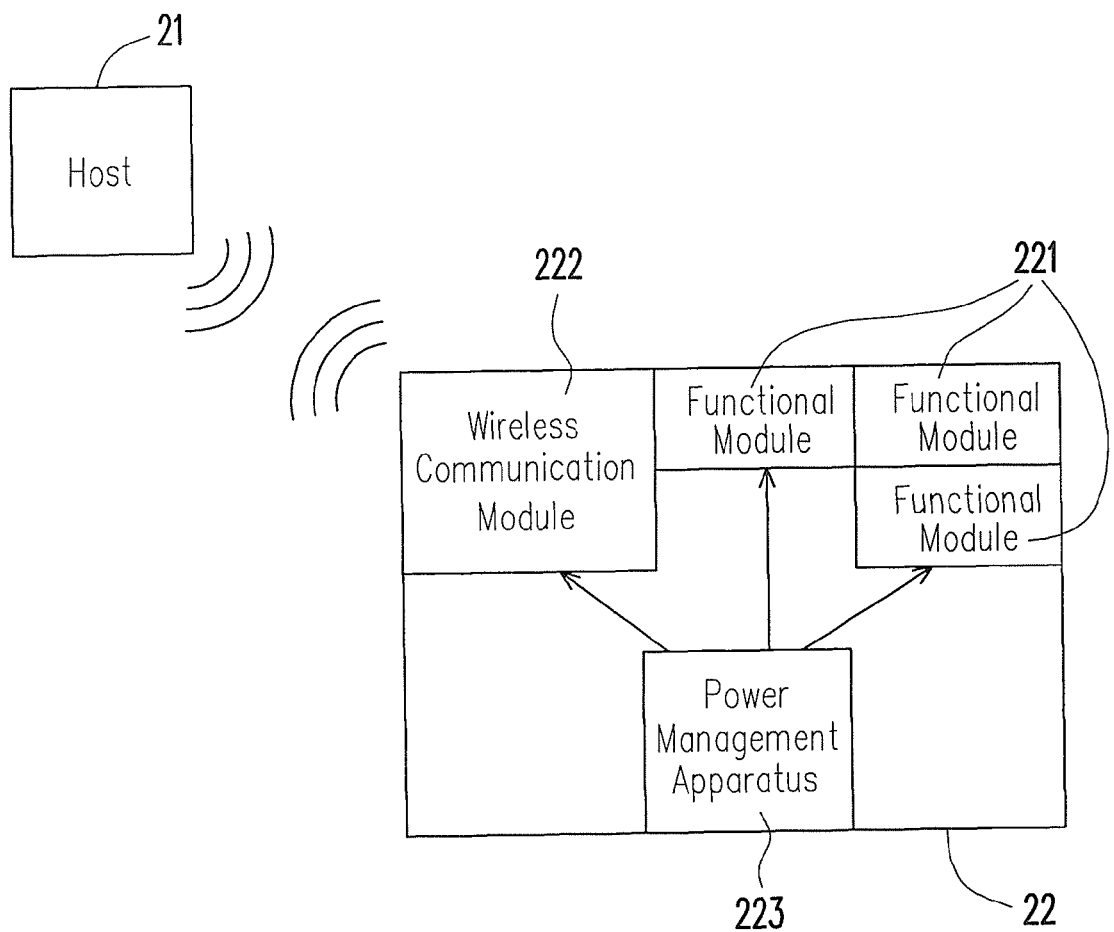
FIG. 2 is a schematic view of a computer system according to an embodiment of the present invention.
Figure 3:
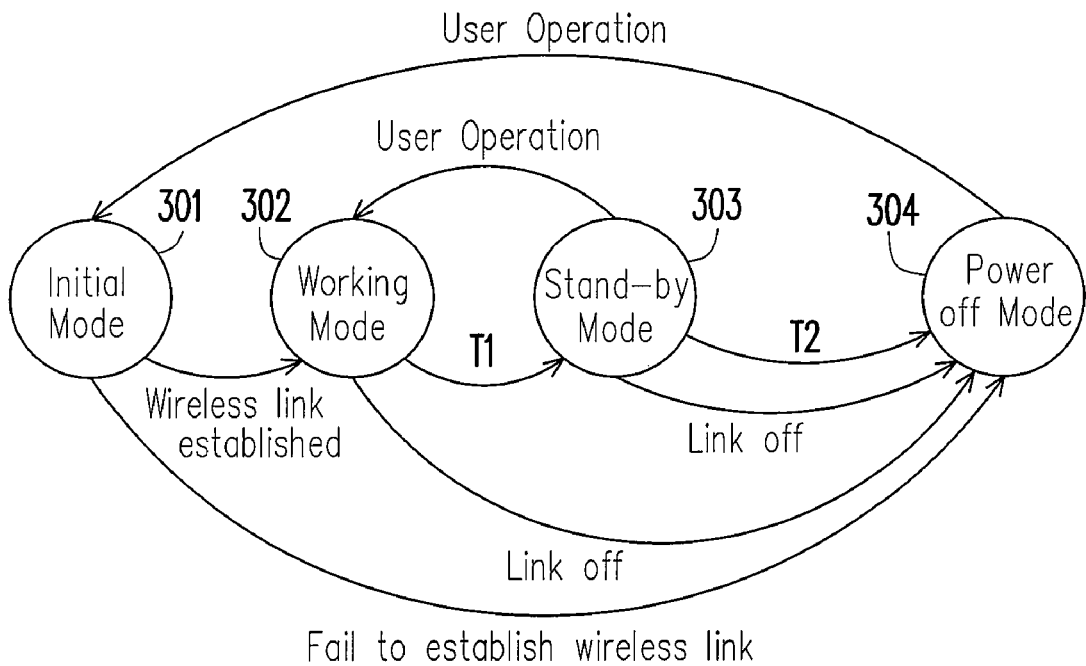
FIG. 3 is a schematic view of a state machine in a power management apparatus 223 according to an embodiment of FIG. 2 of the present invention.

FIG. 2 is a schematic view of a computer system of an embodiment of the present invention. Referring to FIG. 2, the computer system includes a host 21 and a bi-directional communication wireless peripheral device 22 of an embodiment of the present invention. The bi-directional communication wireless peripheral device 22 includes a plurality of functional modules 221, a wireless communication module 222, and a power management apparatus 223. FIG. 3 is a schematic view of a state machine in a power management apparatus 223 according to an embodiment of FIG. 2 of the present invention. In order to clearly illustrate the embodiment and the spirit of the present invention, the bidirectional communication wireless peripheral device 22 of the above embodiment is, for example, a wireless mouse. It should be known that wireless mice, wireless keyboards, wireless Bluetooth headsets, and wireless microphones can be used as the wireless peripheral device 22. Further, computers, notebook computers (NB), personal digital assistants (PDA), mobile phones having wireless transceiver modules can be used as the host 21, so the present invention is not limited herein.

Referring to FIGS. 2 and 3, the user operates to power on the wireless mouse 22. At this time, the state machine in the power management apparatus 223 enters the initial mode 301 from the power off mode 304. After entering the initial mode 301, the wireless mouse 22 starts to control the wireless communication module 222 therein to establish a bi-directional communication wireless link to the host 21 through a communication protocol (e.g. a Bluetooth ACL link for HID protocol stack). A common method involves sending a signal packet meeting the wireless communication protocol and waiting for the response of the host 21. When the host 21 responds to the signal, the bi-directional communication wireless link starts to be established. When the bi-directional communication wireless link is successfully established, the state machine in the power management apparatus 223 enters the working mode 302 from the initial mode 301. The user can use the wireless mouse 22 to complete cursor control and click actions on the host 21. If it is assumed that the wireless mouse 22 is too far away from the host 21 or the host 21 is not powered on, the wireless link is not established, and the state machine in the power management apparatus 223 will be directly reinstated the power off mode 304.

Then, if the user operates the wireless mouse 22 to power off the host 21, the host 21 usually informs the wireless mouse 22 to start the power off process and to disconnect the wireless link. When the disconnection process is completed, the state machine in the power management apparatus 223 enters the power off mode 304 from the working mode 302. The power management apparatus 223 turns off the power of the functional modules 221 and the wireless communication module 222. In this manner, the unnecessary power consumption is greatly reduced.

If only the above power-saving method is used, it may be insufficient in some circumstances. If the wireless link is still in a connected state, in this embodiment, when the user does not operate the wireless mouse 22 in a period of time T1, the state machine in the power management apparatus 223 enters the stand-by mode 303 from the working mode 302. The power management apparatus 223 turns off the power of a part of the functional modules 221 or decreases the operating clock frequency to reduce the power consumption from time to time and to prolong the service life of the battery. In the stand-by mode 302, if the wireless peripheral device still does not receive a user operation for another period of time T2, the state machine in the power management apparatus 223 enters the power off mode 304 from the stand-by mode 303, and turns off the power of the functional module 221 and the wireless communication module 222. In addition, in the working mode 302 or the stand-by mode 303, if the bi-directional communication wireless link between the host 21 and the wireless mouse 22 breaks off, the state machine in the power management apparatus 223 directly enters the power off mode 304.

Figure 4:
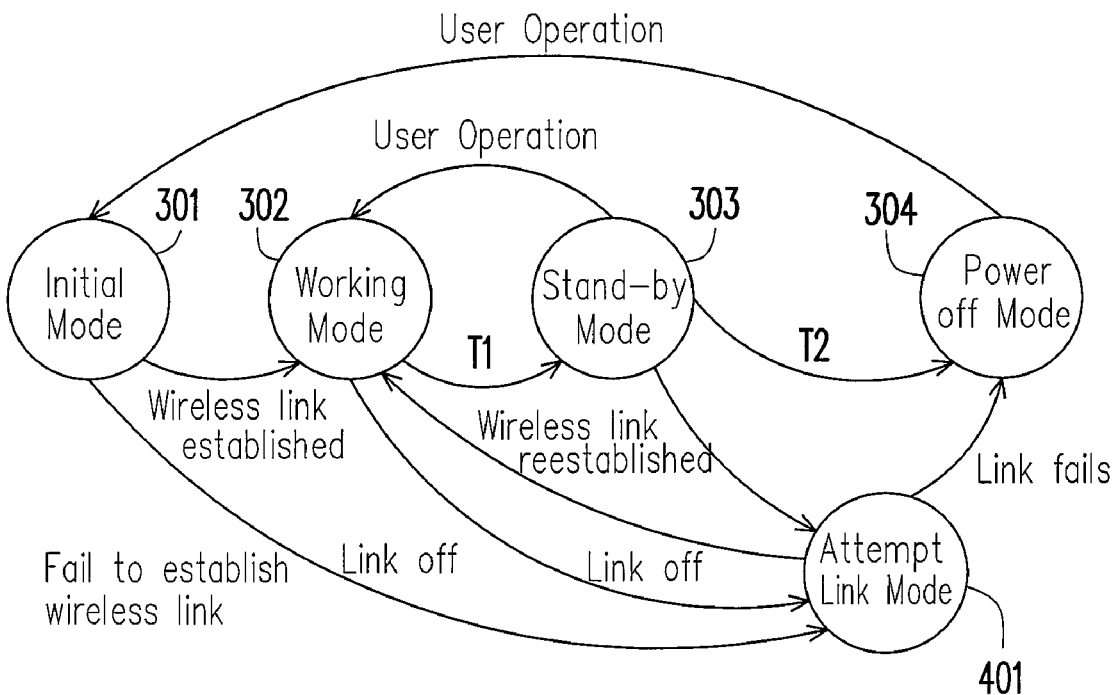
FIG. 4 is a schematic view of the state machine in a power management apparatus 223 according to an embodiment of FIG. 2 of the present invention.

It should be noted that although a possible form of the power saving method and the bi-directional communication wireless peripheral device of the present embodiment is described in the above examples, those of ordinary skill in the art should known that the bi-directional communication wireless link may not always remain in the state of good signal. Occasionally, the wireless link may be interfered by environmental factors. For example, the bi-directional communication wireless link may be temporarily interfered by the shielding of antenna, too many wireless apparatuses using the same communication frequency band, or the like. Therefore, the state machine of FIG. 3 can be slightly modified into that in FIG. 4. After the wireless peripheral device 22 determines that the bi-directional communication wireless link is in a disconnected state, it enters an attempt link mode 401, such that the wireless communication module 222 attempts to link to the host at least once, so as to establish the bi-directional communication wireless link at once after the temporary interference factors are eliminated. After several times of link attempts fail, the non-temporary interference factors are assured, and the wireless peripheral device 22 enters the power off mode 304.

To sum up, the present invention adopts the wireless communication protocol for establishing a bi-directional communication wireless link between the host and the bi-directional communication wireless peripheral device. When it fails to establish the bi-directional communication wireless link, the bi-directional communication wireless peripheral device enters a power off mode. After the bi-directional communication wireless link is established, if the link breaks off, the bi-directional communication wireless peripheral device immediately enters the power off mode, or enters the power off mode after the link attempt(s) fails. Therefore, it is unnecessary to consume the electric energy for waiting for a fixed preset time period to enter the power off mode in the conventional art. Therefore, in the present invention, the unnecessary power consumption can be greatly reduced, and the service life of the bi-directional communication wireless peripheral device can be prolonged.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power saving method for a bi-directional communication wireless peripheral device in communication with a host, comprising:

providing a wireless communication protocol between the host and the bi-directional communication wireless peripheral device;

establishing a bi-directional communication wireless link between the host and the bi-directional communication wireless peripheral device through the wireless communication protocol; and entering a power off mode when the bi-directional communication wireless link does not exist, wherein in the power off mode, a plurality of functional modules in the bi-directional communication wireless peripheral device is in a non-operating state, wherein the bi-directional communication wireless peripheral device further comprises the following operational modes: an initial mode, a working mode, a stand-by mode, wherein in the initial mode, the functional modules of the bi-directional communication wireless peripheral device are activated, the bi-directional communication wireless link is attempted to be established, the working mode is entered when the bi-directional communication wireless link is established, and the power off mode is entered when the bi-directional communication wireless link fails to be established; in the working mode, the functional modules are in the operating state; and in the stand-by mode, a part of the functional modules are in the non-operating state, if the bi-directional communication wireless peripheral device receives a user operation in a first predetermined time, the bi-directional communication wireless peripheral device will enter the working mode from the stand-by mode, if the bi-directional communication wireless peripheral device does not receive a user operation for the first predetermined time or the bi-directional communication wireless link does not exist, the bi-directional communication wireless peripheral device will enter the power off mode from the stand-by mode.

2. The power saving method as claimed in claim 1, further comprising:

entering the stand-by mode after a second predetermined time since the bi-directional communication wireless peripheral device does not receive the user operation in the working mode.

3. The power saving method as claimed in claim 1, wherein the bi-directional communication wireless peripheral device further comprises an attempt link mode, when the bi-directional communication wireless link breaks off, the bi-directional communication wireless peripheral device enters the attempt link mode to reestablish the bi-directional communication wireless link.

4. The power saving method as claimed in claim 3, wherein "when the bi-directional communication wireless link breaks off", the method further comprises:

when the bi-directional communication wireless link breaks off, firstly entering the attempt link mode to attempt to reestablish the bi-directional communication wireless link at least once; and when it fails to establish the bi-directional communication wireless link, entering the power off mode.

5. A bi-directional communication wireless peripheral device, comprising:

a plurality of functional modules;

a wireless communication module, comprising a wireless communication protocol, for establishing a bi-directional communication wireless link to a host through the wireless communication protocol; and a power management apparatus, turning off the functional modules when the bi-directional communication wireless link does not exist, wherein the power management apparatus comprises:

a state machine, comprising:

an initial mode, for activating a plurality of functional modules of the bi-directional communication wireless peripheral device, establishing the bi-directional communication wireless link, entering a working mode when the bi-directional communication wireless link is established, and entering a power off mode when the bi-directional communication wireless link fails to be established;

the working mode, in which the functional modules are in the operating state;

a stand-by mode, in which a part of the functional modules are in the non-operating state, if the bi-directional communication wireless peripheral device in the stand-by mode receives a user operation in a predetermined time, the bi-directional communication wireless peripheral device will enter the working mode from the stand-by mode; and the power off mode, for making the functional modules being in the non-operating state, wherein when the bi-directional communication wireless link is established, enter the working mode; after the predetermined time since the bi-directional communication wireless peripheral device does not receive a user operation, enter the stand-by mode; and when the bi-directional communication wireless link does not exist, enter the power off mode.

6. The bi-directional communication wireless peripheral device as claimed in claim 5, wherein the state machine further comprises:

an attempt link mode, wherein when the bi-directional communication wireless peripheral device fails to establish the bi-directional communication wireless link in the initial mode, or the bi-directional communication wireless link breaks off in the working mode or the stand-by mode, enter the attempt link mode to reestablish link.

* * * * *